US009016697B2

(12) United States Patent
Boyd et al.

(10) Patent No.: US 9,016,697 B2
(45) Date of Patent: Apr. 28, 2015

(54) SPACER AND GASKET ASSEMBLY FOR USE ON AN AIRCRAFT

(71) Applicant: Aviation Devices & Electronic Components, L.L.C., Fort Worth, TX (US)

(72) Inventors: Matt Boyd, Fort Worth, TX (US); Michael Dry, Fort Worth, TX (US); Kent Boomer, Aledo, TX (US); Jeff Busby, Millsap, TX (US)

(73) Assignee: Aviation Devices & Electronic Components, LLC, Fort Worth, TX (US)

( * ) Notice: Subject to any disclaimer, the term of this patent is extended or adjusted under 35 U.S.C. 154(b) by 0 days.

(21) Appl. No.: 13/793,533

(22) Filed: Mar. 11, 2013

(65) Prior Publication Data

US 2014/0015204 A1    Jan. 16, 2014

Related U.S. Application Data

(60) Provisional application No. 61/669,957, filed on Jul. 10, 2012.

(51) Int. Cl.
*F16J 15/02* (2006.01)
*F16J 15/06* (2006.01)
(Continued)

(52) U.S. Cl.
CPC .............. *F16J 15/021* (2013.01); *F16J 15/061* (2013.01); *F16J 15/104* (2013.01); *F16J 15/122* (2013.01); *F16J 15/127* (2013.01)

(58) Field of Classification Search
CPC ........ F16J 15/104; F16J 15/122; F16J 15/127
USPC ......... 277/650, 651, 652, 653, 654, 628, 630, 277/639
See application file for complete search history.

(56) References Cited

U.S. PATENT DOCUMENTS

| 1,851,948 A | 3/1932 | Summers |
| 2,092,393 A | 9/1937 | Hewitt |

(Continued)

FOREIGN PATENT DOCUMENTS

| DE | 3720224 A1 | 1/1989 |
| JP | 09109346 A | 4/1997 |
| WO | 2005030893 | 9/2005 |

OTHER PUBLICATIONS

"Conductive Elastomer Gasket Design," Chomerics, www.chomerics.com, pp. 1-9 Jan. 1, 2011.

(Continued)

*Primary Examiner* — Gilbert Lee
(74) *Attorney, Agent, or Firm* — Jackson Walker, LLP (57) ABSTRACT

A spacer and gasket assembly is shown for receipt between a static structure having an outer and inner surface and fastener holes therethrough and a removable structure having a base with fastener holes and an upper surface and a lower surface. The static structure and removable structure are engaged through a multiplicity of fasteners having a shaft diameter. The fasteners are adapted to apply a compression on the gasket between the static structure and the removable structure. The static structure and the removable structure have opposed, typically flat, facing walls. The spacer and gasket assembly comprising a substantially non-compressible spacer adapted for receipt between the static structure and the removable structure having a spacer thickness. A gasket has a deformable, flowable, elastomeric body and a skeleton having a skeleton thickness, the skeleton substantially integral with the body. The gasket has an uncompressed gasket thickness. The spacer and the gasket are adapted to be placed substantially between the facing walls of the static structure and the removable structure and the removable structure will compress and deform the gasket when the fasteners are torqued down.

16 Claims, 6 Drawing Sheets

(51) Int. Cl.
*F16J 15/10* (2006.01)
*F16J 15/12* (2006.01)

(56) References Cited

U.S. PATENT DOCUMENTS

| | | |
|---|---|---|
| 3,126,440 A | 3/1964 | Goodloe |
| 3,195,906 A | 7/1965 | Moyers |
| 3,473,813 A | 10/1969 | Meyers |
| 3,532,349 A | 10/1970 | Czernik |
| 3,542,939 A | 11/1970 | Mintz |
| 3,555,168 A | 1/1971 | Frykberg |
| 3,681,272 A | 8/1972 | Gloskey |
| 3,863,936 A | 2/1975 | Farnam |
| 3,993,833 A | 11/1976 | Esmay |
| 4,037,009 A | 7/1977 | Severinsen |
| 4,090,988 A | 5/1978 | Babiec |
| 4,183,699 A | 1/1980 | Donan |
| 4,204,691 A | 5/1980 | Makino |
| 4,325,280 A | 4/1982 | Hardy |
| 4,485,138 A * | 11/1984 | Yamamoto et al. ........... 428/131 |
| 4,530,443 A | 7/1985 | Gorges |
| 4,544,169 A | 10/1985 | Cobb |
| 4,635,949 A | 1/1987 | Lucas |
| 4,835,060 A | 5/1989 | Kosiarski |
| 4,900,629 A | 2/1990 | Pitolaj |
| 4,900,877 A | 2/1990 | Dubrow |
| RE33,392 E | 10/1990 | Brauer |
| 5,037,879 A | 8/1991 | Roberts |
| 5,054,793 A | 10/1991 | Hauenstein |
| 5,158,638 A | 10/1992 | Osanami |
| 5,456,442 A * | 10/1995 | Sutton et al. ................. 248/534 |
| 5,512,709 A | 4/1996 | Jencks et al. |
| 5,556,113 A * | 9/1996 | Amorese et al. ............. 277/651 |
| 5,702,111 A | 12/1997 | Smith |
| 5,791,654 A | 8/1998 | Gaines et al. |
| 5,890,719 A | 4/1999 | Bettencourt |
| 5,910,524 A | 6/1999 | Kalinoski |
| 5,929,138 A | 7/1999 | Mercer et al. |
| 6,056,526 A | 5/2000 | Sato |
| 6,121,545 A | 9/2000 | Peng |
| 6,346,330 B1 | 2/2002 | Huang et al. |
| 6,364,976 B2 | 4/2002 | Fletemier |
| 6,365,812 B1 | 4/2002 | McGill |
| 6,403,226 B1 | 6/2002 | Biernath et al. |
| 6,460,859 B1 | 10/2002 | Hammi et al. |
| 6,530,577 B1 | 3/2003 | Busby |
| 6,553,664 B1 | 4/2003 | Schenk |
| 6,598,883 B1 | 7/2003 | Hammi et al. |
| 6,695,320 B2 | 2/2004 | Busby |
| 7,229,516 B2 | 6/2007 | Busby |
| 7,290,769 B2 | 11/2007 | Piona |
| 7,314,898 B2 | 1/2008 | Downing, Jr. et al. |
| 7,654,538 B2 | 2/2010 | Oka |
| 2002/0135137 A1 | 9/2002 | Hammi |
| 2004/0070156 A1 | 4/2004 | Smith |
| 2005/0023768 A1 | 2/2005 | Adams |
| 2009/0322040 A1 | 12/2009 | Banba et al. |
| 2010/0258200 A1 | 10/2010 | Walker |
| 2011/0156353 A1 | 6/2011 | Kabutoya et al. |

OTHER PUBLICATIONS

"Technical Data Sheet," PN# 1500101130CR, VTT/Shieldex Trading USA, www.shieldextrading.net/product_INDEX.html, 9 pages Jan. 20, 2010.
Tecknit, EMI Shielding Products, Mesh & Elastomer Combination Gaskets, www.tecknit.com/meshelas.html Aug. 31, 2012.
Tecknit, EMI Shielding Products, Oriented Wire Mesh Strip & Gasket Material, www.tecknit.com/orient.html Aug. 31, 2012.
Tecknit, EMI Shielding Products, Conductive Silicone Elastomers, www.tecknit.com/silelast.html Aug. 31, 2012.
Loos & Co., Inc., Knitted Wire Mesh, www.loosco.com/index.php?page=knitted-wire-mesh, 3 pages Dec. 7, 2012.
European Search Report, Application No. 132765161.1-1751, 7 pages Jun. 11, 2013.

* cited by examiner

SPACER AND GASKET ASSEMBLY FOR USE ON AN AIRCRAFT

This application claims priority to, benefit of, and incorporates herein by reference, U.S. Provisional Application Ser. No. 61/669,957, filed Jul. 10, 2012.

FIELD OF THE INVENTION

Multi-component aircraft assemblies and, more particularly, to a spacer and gasket assembly for an interposition under compression between a static structure of an aircraft and a removable structure of an aircraft.

BACKGROUND OF THE INVENTION

The use of gaskets for environmental sealing in aircraft, especially the outside of an aircraft, has some unique challenges. In its lifetime, an aircraft will undergo environmental extremes, pressures ranging from those typically found at sea level to the extremely air pressures found at 40,000-50,000 feet. Temperature ranges are also subject to extremes, as are humidity conditions and pressure differentials across a gasket.

Given such a radical and extreme environment, environmental seals, such as gaskets and gasket assemblies, especially those adapted for use on an aircraft exterior, must often have unique properties. Furthermore, the gaskets sometimes must be adapted to be conductive or nonconductive between the pieces that they join, depending upon their application. Furthermore, potential reactivity with the aircraft structures to which they engage is yet another consideration.

SUMMARY OF THE INVENTION

A spacer and gasket assembly for receipt between a static structure having an outer and inner surface and fastener holes therethrough and a removable structure having a base with fastener holes and an upper surface and a lower surface, the static structure and removable structure being engaged through a multiplicity of fasteners adapted to apply a compression on the gasket between the static structure and the removable structure, the spacer and gasket assembly. The assembly comprises a substantially non-compressible spacer adapted for receipt between the static structure, and the removable structure having a spacer thickness; and a compressible gasket having a deformable, flowable (under compression) elastomeric body and a crushable skeleton, substantially enclosed with the body. The spacer and the gasket are placed between the static structure and the removable structure and the fasteners torqued to a preselected value.

BRIEF DESCRIPTION OF THE DRAWINGS

FIGS. 2 and 3 are cross-sectional views of Applicants' spacer and gasket assembly between a removable structure and a static structure on an aircraft body; FIG. 2 before compression; FIG. 3 after compression.

FIGS. 6, 7, and 8 are exploded perspective and side elevation cross-sections of an alternate preferred embodiment of Applicants' spacer and gasket assembly. FIG. 7 before compression; FIG. 8 following compression.

DETAILED DESCRIPTION OF THE PREFERRED EMBODIMENTS

FIGS. 1-5 illustrate an embodiment of Applicants' spacer and gasket assembly 10, seen in an embodiment to include a spacer or other mechanical stop, such as a washer 12, and a gasket 14 for interposition in a stacked arrangement between a removable workpiece 28 and a static structure 30.

Figure 1:
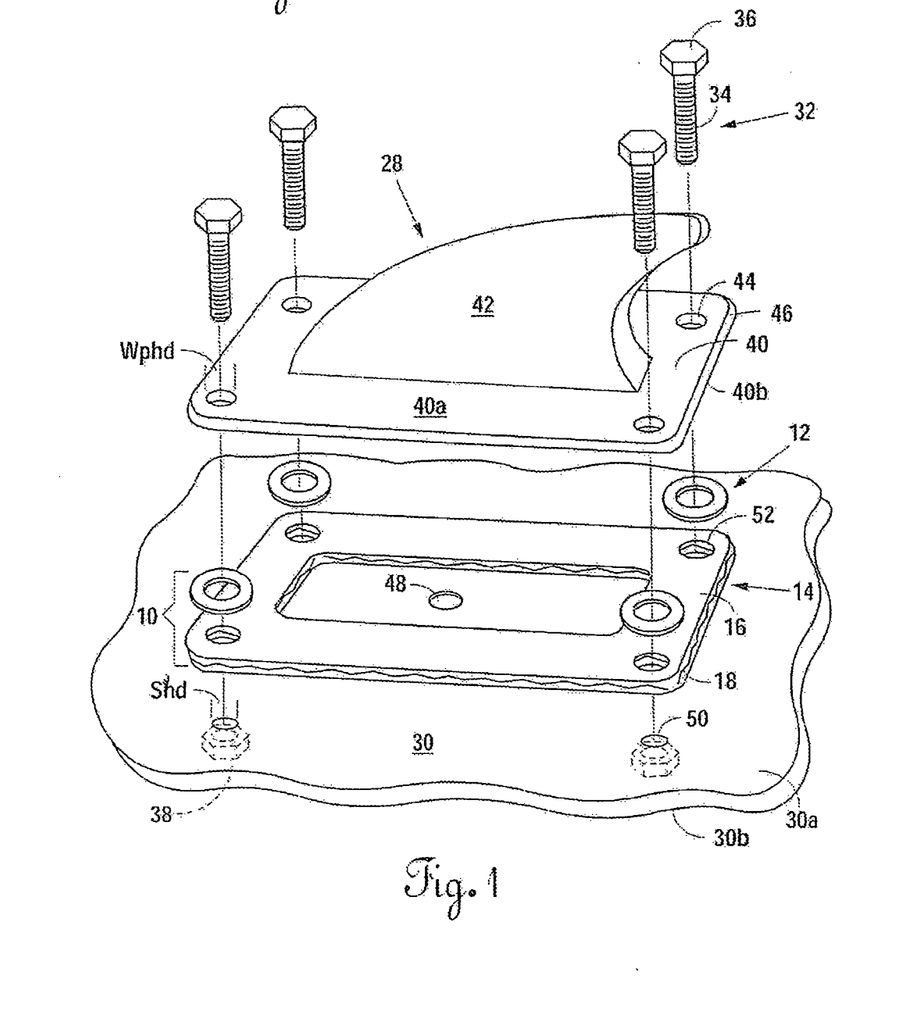
FIG. 1 is an exploded perspective view of Applicants' spacer and gasket assembly as used on an aircraft between a static structure and a removable structure.
Figure 1A:
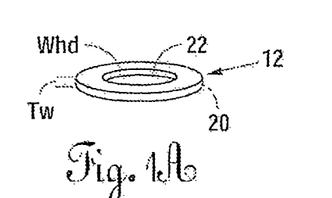
FIG. 1A is a perspective view of a washer for use with the present invention.

A multiplicity of fasteners 32 may be provided for engaging the removable workpiece 28 and static structure 30, the fasteners typically including a shaft 34 with a threaded portion thereon, the shaft having a head 36 at one end, such as a hex head, for engaging a drive tool, such as a torque wrench. Shaft 34 is adapted to engage a nut 38, such as a blind nut or captured nut 38, as illustrated in FIG. 1.

Removable workpiece 28 may, in one embodiment, be an aircraft antenna for removable receipt against a gasket 14 and a washer 12 for attachment to static structure 30 which, in a preferred embodiment, may be the outer fuselage of an aircraft body. Removable workpiece 28 may include a base 40, which may be tabular, with an upper surface 40a and a lower surface 40b. Lower surface 40b may be planer or slightly curved and may conform in shape to outer surface 30a of static structure 30. For example, if outer surface 30a is flat, lower surface 40b may be adapted to conform to the flat outer surface 30a of the static structure and may be flat also. If there is a slight curve to outer surface 30a, lower surface 40b may match the curve of outer surface 30a of the static structure.

Removable workpiece 28 may include an extended member 42, such as the fin of an antenna, the antenna for receipt or transmission of RF or other signals from an aircraft. Removable workpiece 28 may also include a multiplicity of fastener receiving holes 44, the holes with a diameter of Wpd (workpiece diameter). Moreover, the removable workpiece may have an outer perimeter 46.

Static structure 30 may include an access port 48, such as in one embodiment, an access port 48 for electrically conductive cables engaging an antenna electrically to the interior of an aircraft. Outer surface 30a may represent the skin of an aircraft and inner surface 30b may represent the underside thereof. Fastener holes 50 may be provided for receipt of fasteners 32 therethrough, the fastener holes having a diameter of Shd, which is typically equal to diameter Wphd, which is, just slightly larger than the diameter of the shaft that is carried in holes 44/50.

Turning now to gasket 14, gasket 14 may include a body 16 of any suitable compressible and deformable medium, and a skeleton 18, the skeleton may be electrically conductive or non-conductive and may be woven or non-woven and, in one embodiment, may be woven fiberglass (i.e., non-conductive) and in another embodiment may be woven aluminum wire (i.e., conductive). A skeleton 18 may be crushable; that is, under some compression, such as about 150-250 psi, may flatten out or otherwise deform. In one specific embodiment, skeleton 18 is a woven fiberglass member.

Typically, a crushable skeleton will be one that will undergo permanent deformation under compression between a workpiece, such as an aircraft antenna and a base, such as the wing or fuselage of an aircraft. In one embodiment, there would be permanent deformation or set, so that when pressure is released, there will be very little rebound of the fibers of the crushed skeleton. In one embodiment, the crushable skeleton is woven. In one embodiment of woven skeletons, the skeleton may be metallic, such as an 18×18 strands per inch woven mesh (17 mil strand diameter), aluminum fabric available from Cleveland Wire Cloth, Cleveland, Ohio. In another embodiment, the crushable skeleton may be a non-metallic fabric, such as a woven fiberglass fabric. One such fabric is available from Phifer, Tuscaloosa, Ala., Part No. 3021975, which provides a woven fiberglass non-metallic screen.

Typically, the body is coherent with the skeleton. Typically, the skeleton is typically not a solid sheet, but one with many holes or pores. The gasket material, for example, polyurethane, will run, pre-cured, through the pores like many tiny arms and hook up with other arms of elastomer running through the holes, such as to provide, on curing, a coherent, integrated skeleton, elastomeric gasket.

In a preferred embodiment, gasket 14 may be an Avdec product, for example, Part Nos. AG8430000-88, AG723000-28 or AG822000-14. These gasket bodies and skeleton combinations are disclosed in the following Avdec patents incorporated herein by reference: U.S. Pat. Nos. 6,530,577; 6,695,320; and 7,229,516.

Figure 2:
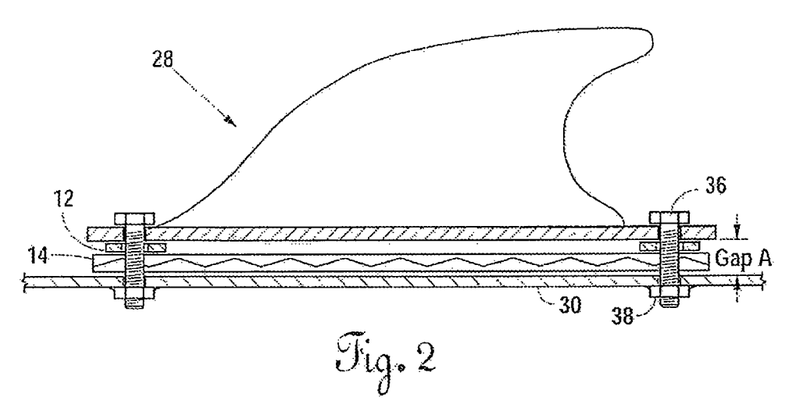
Figure 3:
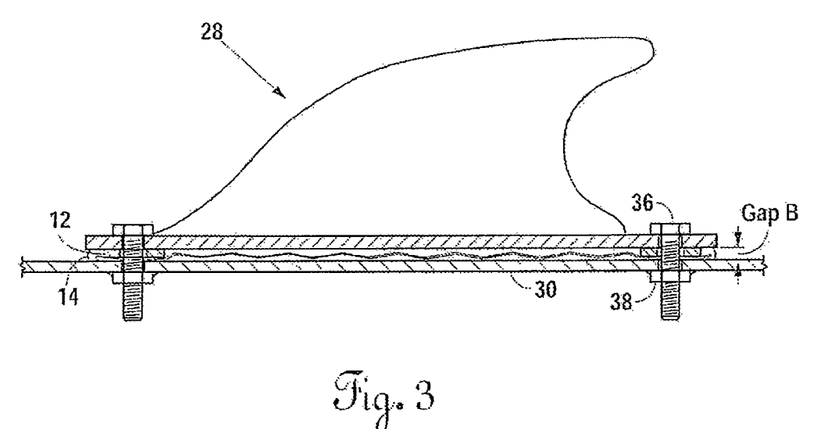

FIGS. 2 and 3 illustrate that the washer 12 may lay stacked in a pre-compression state above the upper surface of the gasket, prior to compression (FIG. 2). Compression is accomplished by rotation of fastener head 36 against non-movable nut 38, which compression may be achieved with a torque wrench to preselected values.

A comparison of FIG. 2 to FIG. 3 will illustrate that under compression, the gasket 14 will deform, with the body at least flowable and deformable by displacement of the washer thereinto. However, it is also seen that, typically, preselected torque limits will be reached before all of the elastomer between the lower surface of the washer and the base is squeezed out. That is to say, in one embodiment, there is typically a gap between the lower surface of the washer and the upper surface of the static structure that leaves some elastomer and some skeletal material (typically crushed) therebetween. If the skeletal material is a woven metallic mesh, it typically engages both the underside of the antenna (moveable piece) and outer surface of the aircraft fuselage (static).

One of the uses of Applicants' washer assembly is to or substantially eliminate the re-torque requirements when standard elastomeric gaskets, used without washers, are tightened between a removable workpiece and a static structure. In the prior art, the deformable and flowable nature of the body of the gaskets caused (after an initial torque to a preselected value) a drop in the released torque after a period of time, for example, 15 to 60 minutes. That is to say, prior art gaskets, required for properly seating the gasket between the removable workpiece and static structure required re-torquing (back up to a preselect value) after a period of time. This is likely due to the set of the elastomeric body, deformation taking place over a period of time under compression, which would require re-torquing of fasteners 32.

Figure 4:
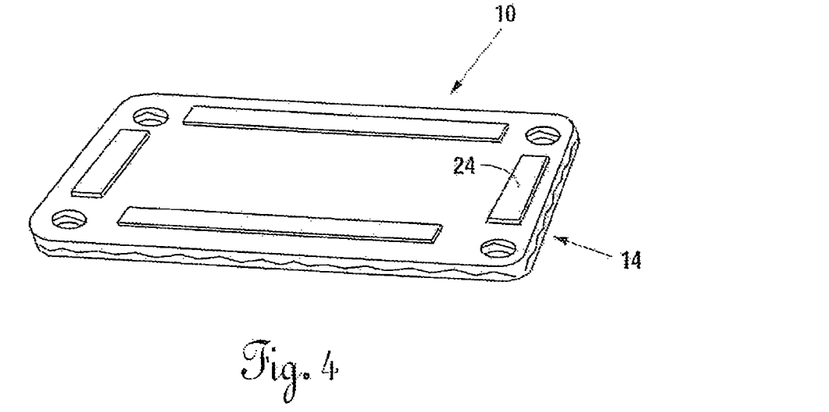
FIGS. 4 and 5 are alternate preferred embodiments of Applicants' spacer and gasket assembly.
Figure 5:
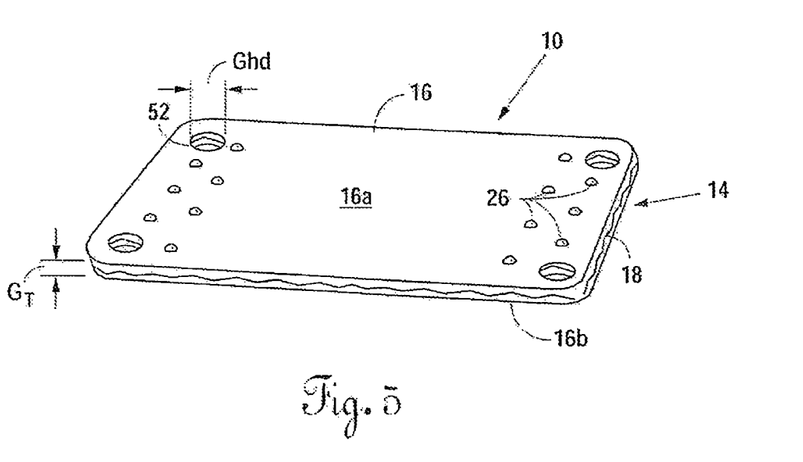

Applicants' use of a novel spacer and gasket assembly provides a substantially incompressible mechanical stop, such as washer or, in the embodiments set forth in FIGS. 4 and 5, plates 24 or spheres 26 (or any suitable configuration). Such substantially non-compressible members, when stacked with relation to the deformable body of the gasket, including, typically, a compressible skeleton, will provide a substantial mechanical block, such that initial torquing of the fasteners to a preselected value will not result in a substantial drop (over time) in the torque value. Therefore, re-torquing may be eliminated.

In FIGS. 1-3, the mechanical stop is seen to be configured as a washer, that is, a generally cylindrical body having flat upper and flat lower surfaces, and having a thickness Tw, an outer perimeter 20, and an inner perimeter 22. The diameter of the inner cutout of the washer is designated Whd.

In a preferred embodiment, the washers are stacked (placed on top of the gasket) (see FIGS. 2 and 3), and washer thickness Tw may be nominally 0.03" or in the range of 0.01" and 0.07". Gasket thickness may be nominally 0.045" or in the range of 0.015" and 0.120". The hardness of the elastomer body may, in one embodiment, be in the range given in the previous Avdec patents and the fiberglass skeleton may be woven fiberglass.

Figure 6:
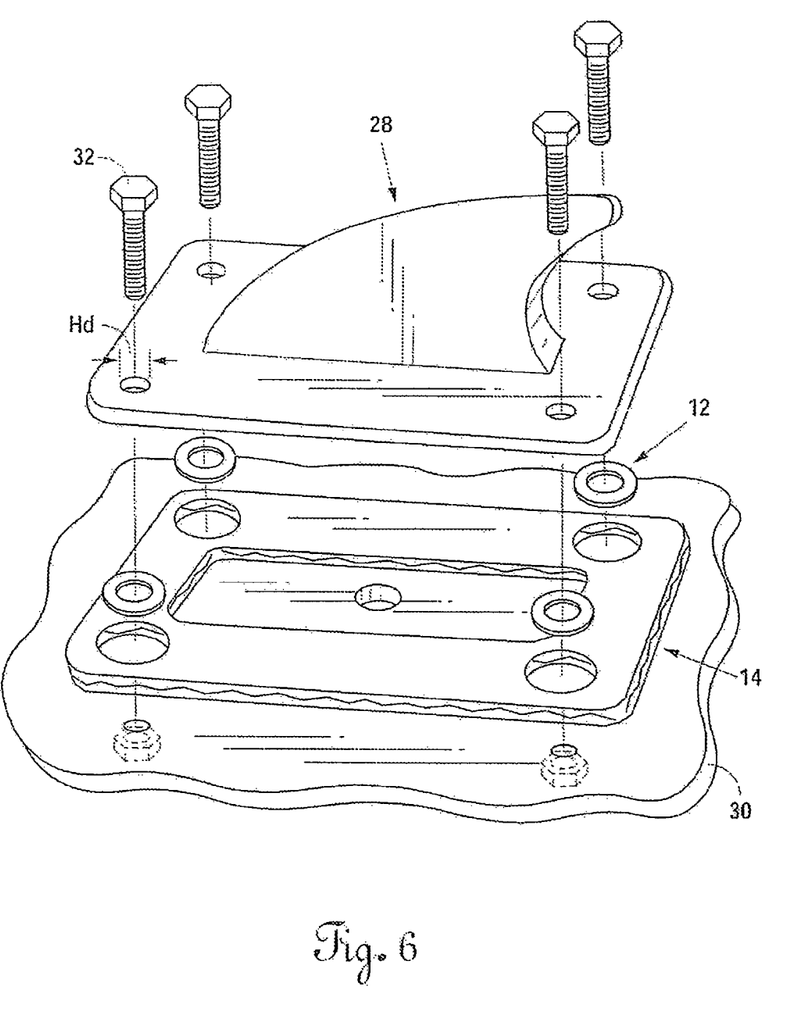
Figure 7:
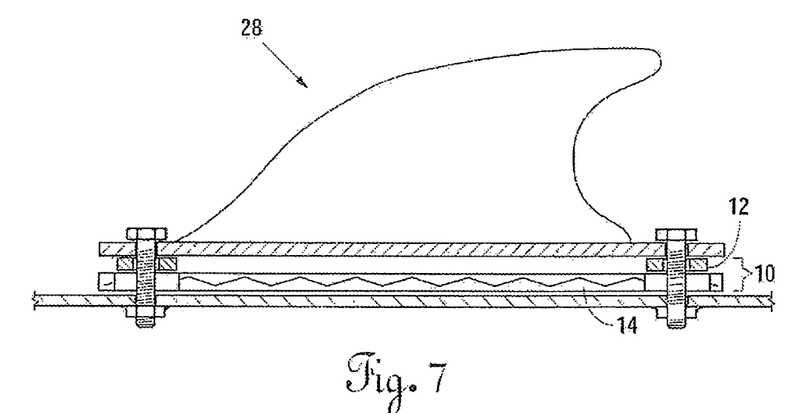
Figure 8:
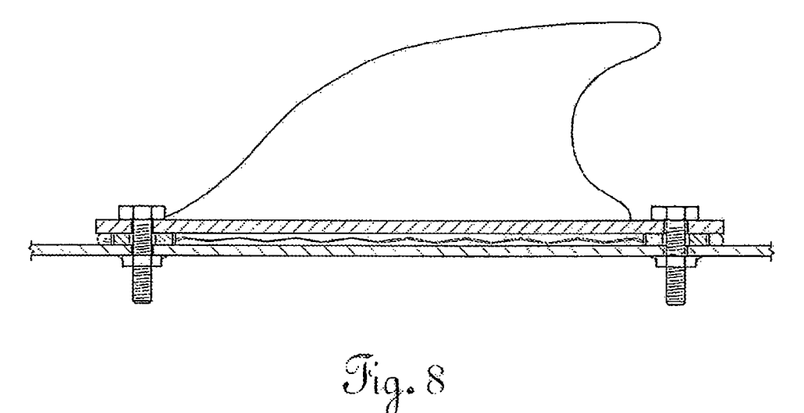

Turning to FIGS. 6 and 7, it may be seen that an alternate preferred embodiment of Applicants' spacer and gasket assembly may be used, wherein the mechanical stops, instead of being stacked on top (or bottom) of the gasket and compressed thereinto, will lay adjacent, in side-by-side fashion, to the gasket, and between the lower surface of the antenna and upper surface of the fuselage. In such case, the gasket is typically about 45 mil (range 15 to 80 mil) thicker than the substantially incompressible mechanical stop and deformation of the body will be occasioned during the initial torquing of fasteners 38.

Gap A, FIG. 2, is seen to be typically in the range of about 25 mil to 200 mil; that is, the gap generated by uncompressed stacked spacer and gasket assembly. FIG. 3 illustrates gap B smaller, the washer being compressed into the body of the gasket, which gap may be in the range of 10 mil to 120 mil, which will typically represent sufficient torque on fasteners 38 to be within aircraft specifications and not require re-torque (typical aircraft antenna mounted to aircraft outer surface, metallic or non-metallic skeleton).

Figure 9A:
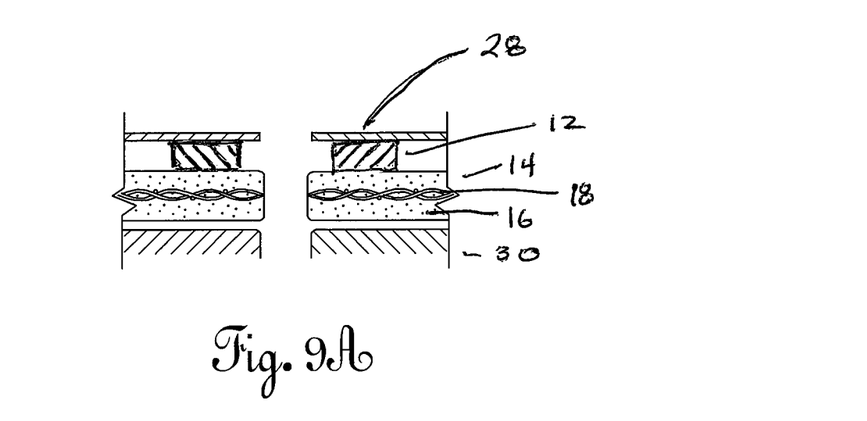
FIGS. 9A, 9B, and 9C illustrate cross-sections of the stacked washer in cross-sectional side view, uncompressed, partially compressed, fully compressed.
Figure 9B:
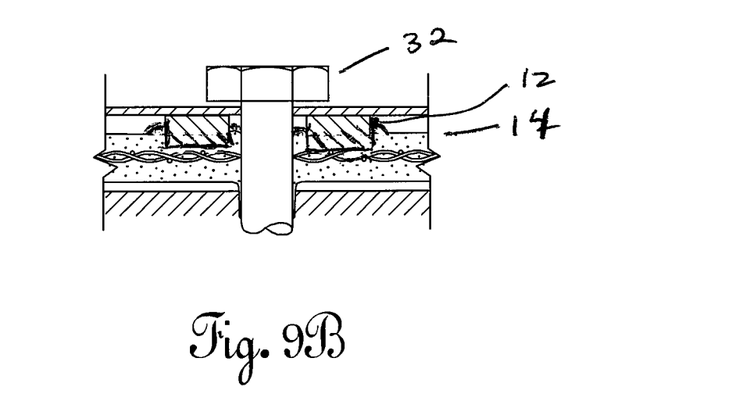
Figure 9C:
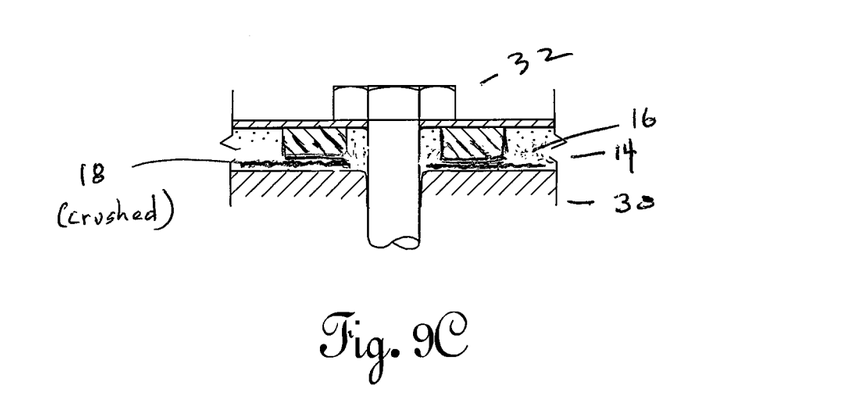

FIG. 2 illustrates a slight cutback or undercut of the outer perimeter of the gasket with respect to the outer perimeter of the workpiece. This indentation is typically sized that, under compression as seen in FIG. 3, the deformation of the elastomer and its subsequent push outward will bring the outer edge of the gasket, when under compression, to about the outer edge of removable workpiece 28. This undercut may be in the range of 50 mil to 250 mil FIGS. 9A, 9B, and 9C illustrate a number of features of embodiments of Applicants' device and assembly. FIG. 9A shows a stacked version uncompressed with the washer laying atop the body of the gasket, the body of the gasket laying on the static member and the top piece being a workpiece, in this case, the antenna of an aircraft. However, under close examination, it may be seen that a hole pre-cut in the gasket for the passage of the fastener therethrough is slightly undercut in one preferred embodiment. The term "undercut" means that the diameter of the hole (typically cylindrical) is equal to or slightly less than the diameter of the shaft of the fastener that is passing through the hole. This will allow some drag on the sticky elastomeric gel as it clings to the shaft of the fastener as the fastener passes through the gasket and into the static structure. This also helps ensure that when the gasket is tightened down and squeeze-out occurs (FIGS. 9B and 9C) that that squeeze-out will be of sufficient volume to fill in and around the gasket holes. It is disadvantageous for too much air to be around the fastener holes.

In one embodiment, Applicants' various assemblies illustrated and described herein are used on the exterior surfaces of aircraft. As a result, there is a substantial pressure difference between the aircraft exterior and the aircraft interior. That pressure difference is typically great as the aircraft climbs to altitude. Moreover, the pressure differences cycle, as do temperature differences. It may be quite cold at a cruising altitude of 40,000 feet and the air pressure quite low. As a result, one of the objects of Applicants' assembly is to sufficiently fill voids or air pockets which might trap gas and moisture when the aircraft thermal and pressure cycles. It has been found that undercutting the gasket around the fastener holes appears to help achieve these benefits. The undercut may be in the order of magnitude of about 15-100 mil in one embodiment. Also, it has been found that "overcutting" the inner diameter of the washer is also beneficial, the overcutting of the washer refers to the inner diameter of the washer being larger than the fastener shaft passing through. This overcut may be in the magnitude of about 15-100 mil in one embodiment.

It is seen in FIGS. 9B and 9C that, as the workpiece is torqued down, the gasket body has sufficient flowability to deform responsive to the washer being pushed into the body. Some of the body material will be pushed inward and help fill the void left by the gap between the washer and the fastener and some will be pressed up against the inner facing wall of the workpiece and the outer facing wall of the static structure.

In FIG. 9C, it is seen that, when sufficient torque is placed on the fastener that the lower surface of the washer will contact the upper surface of the skeleton and press it against the upper surface of the workpiece. In the process of torqueing down the fastener, this can actually be felt (rotational force on the fastener increases) and passing this point typically crushes the fibers of the woven or other crushable skeleton against one another to cause skeletal deformation. This typically ensures that a sufficiently tight seal is made from the workpiece to the static structure.

In another embodiment, as illustrated in FIG. 6, the holes may be overcut, so that the washer is not pressed into the gel body. In one form of this particular embodiment, a metallic skeleton may be used. In one embodiment of such a configuration, if a metallic skeleton is used, for example, for an EMI application where conductivity is desired between the static piece and the moveable piece, then the washer may be either metallic or non-metallic and is slightly thinner than the precrushed thickness of the metallic skeleton. By sizing the skeleton and washer in such a fashion in the overcut application, it will help ensure that there is some crushing of the metallic skeleton, so as to ensure good contact and conductivity before the hard stop or mechanical stop of the underside of the moveable piece against the washer is achieved.

In one embodiment of the various configurations illustrated herein, the gasket is about 45 mil thick with an encapsulated 13 mil skeleton and a 31 mil nylon washer. Typically, the washer will be driven into the skeleton so as to at least partially crush the skeleton.

The fasteners, in one embodiment, may be typically sized between 0.164 inch to 0.250 inch. The gasket is typically tabular and the area may range, in one embodiment, from 25 square inches to 100 square inches. The number of fasteners between the moveable workpiece and the static base may range, in one embodiment, from 4 to 10. The clamping pressure, in one embodiment, may be 150 to 450 psi (to a crushed skeleton). In another embodiment, the range is 150 to 350 psi (to a crushed skeleton). In one embodiment, nylon washers may be used and the gasket may be slightly undersized, typically, in the range of 1/64 inch to 1/32 inch undersized or undercut, for a tight interference fit.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A spacer and gasket assembly for receipt between a static structure having an outer and inner surface and fastener holes therethrough and a removable structure, that is removable with regards to the static structure; the removable structure having a base with fastener holes and an upper surface and a lower surface, the static structure and removable structure being engaged through a multiplicity of fasteners having a shaft diameter, the fasteners adapted to apply a compression on the gasket between the static structure and the removable structure, the static structure and the removeable structure having opposed, typically flat, facing walls, the spacer and gasket assembly comprising:
    multiple, discrete non-compressible spacers, the spacers separate from and not integral with the static or removable structure or the fasteners, the spacers located at multiple discrete spaced apart locations between the static structure and the removable structure, the spacers having a spacer thickness; and
    a gasket having a deformable, flowable, elastomeric gel body and a skeleton having a skeleton thickness, the skeleton substantially integral with the body, the gasket having an uncompressed gasket thickness and an outer perimeter;
        wherein some of the spacers are located at a non-perimeter area of the gasket;
        wherein each spacer is smaller than the gasket and smaller than the base of the removable structure and the gasket is separate from the static and removable structure and adapted to be removably placed substantially between the facing walls of the static structure and the removable structure;
    wherein the spacers are laterally spaced apart from the fasteners, such that compression between removable structure and the static structure provides a mechanical stop and contact with at least one of the static structure or removeable structure.

2. The spacer and gasket assembly of claim 1, wherein the spacer and the gasket are stacked.

3. The spacer and gasket assembly of claim 1, wherein the spacer and the gasket are side by side.

4. The spacer and gasket assembly of claim 1, wherein the skeleton is crushable and at least partly non-metallic.

5. The spacer and gasket assembly of claim 1, wherein the skeleton is crushable and at least partly metallic.

6. The spacer and gasket assembly of claim 1, wherein the body is comprised of cured polyurethane gel and is tabular.

7. The spacer and gasket assembly of claim 1, wherein the gasket includes multiple fastener holes therethrough.

8. The spacer and gasket assembly of claim 7, wherein the gasket fastener holes are of a diameter that is about equal to or less than the shaft diameter of the fasteners.

9. The spacer and gasket assembly of claim 1, wherein the spacer and the gasket are side by side; wherein the skeleton is crushable and non-metallic; wherein the body is comprised of cured polyurethane and is tabular; and wherein the gasket includes multiple fastener holes therethrough.

10. The spacer and gasket assembly of claim 1, wherein the gasket is shaped to receive flat walls of an aircraft antenna and an aircraft fuselage.

11. The spacer and gasket assembly of claim 10, wherein the skeleton is a porous, partially open flexible metallic skeleton being generally tabular in nature and generally ring or rectangular shaped, the skeleton having a generally flat upper surface and an outer perimeter; and wherein the body of the gasket further comprises:
> a pliable, resilient, sticky, coherent, homogeneous, silicon-free polyurethane body, substantially filling the openings of the skeleton and being generally tabular in nature, the body being ring or rectangular shaped having a generally flat, tacky upper surface, a generally flat, tacky lower surface, an outer perimeter wall, the an outer perimeter wall dimensioned about the same as the outer perimeter wall of the skeleton;
> wherein the perimeter walls of both the skeleton and the body generally conform to the shape defined by an outer perimeter of the aircraft antenna flat facing wall.

12. The spacer and gasket assembly of claim 11, wherein the gasket is in an uncompressed state between about 30 and 100 mil thick.

13. The spacer and gasket assembly of claim 11, wherein the gasket is between about 20 and 80 mil thick in a compressed state.

14. The spacer and gasket assembly of claim 11, wherein the compressed condition of the gasket is about 40-80% of its uncompressed thickness.

15. The spacer and gasket assembly of claim 11, wherein the compressed condition of the gasket is about 40-80% of its uncompressed thickness; and wherein the elastomer gel body is cured.

16. A spacer and gasket assembly for receipt between a static structure having an outer and inner surface and fastener holes therethrough and a removable structure, that is removable with regards to the static structure; the removable structure having a base with fastener holes and an upper surface and a lower surface, the static structure and removable structure being engaged through a multiplicity of fasteners having a shaft diameter, the fasteners adapted to apply a compression on the gasket between the static structure and the removable structure, the static structure and the removeable structure having opposed, typically flat, facing walls, the spacer and gasket assembly comprising:
> a multiplicity of discrete, substantially non-compressible spacers adapted for receipt between the static structure and the removable structure, each spacer having a spacer thickness; and
> a gasket having a deformable, flowable, cured elastomeric gel body and a skeleton having a skeleton thickness, the skeleton substantially integral with the body, the gasket having an uncompressed gasket thickness and an outer perimeter;
>> wherein the spacers are is located at non-fastener areas of the gasket;
>> wherein spacer and the gasket are separate from the static and removable structure are adapted to be removably placed substantially between the facing walls of the static structure and the removable structure to provide a mechanical stop.

* * * * *